Nov. 24, 1925.
C. J. MUEND
VALVE
Filed Dec. 28, 1921
1,562,979
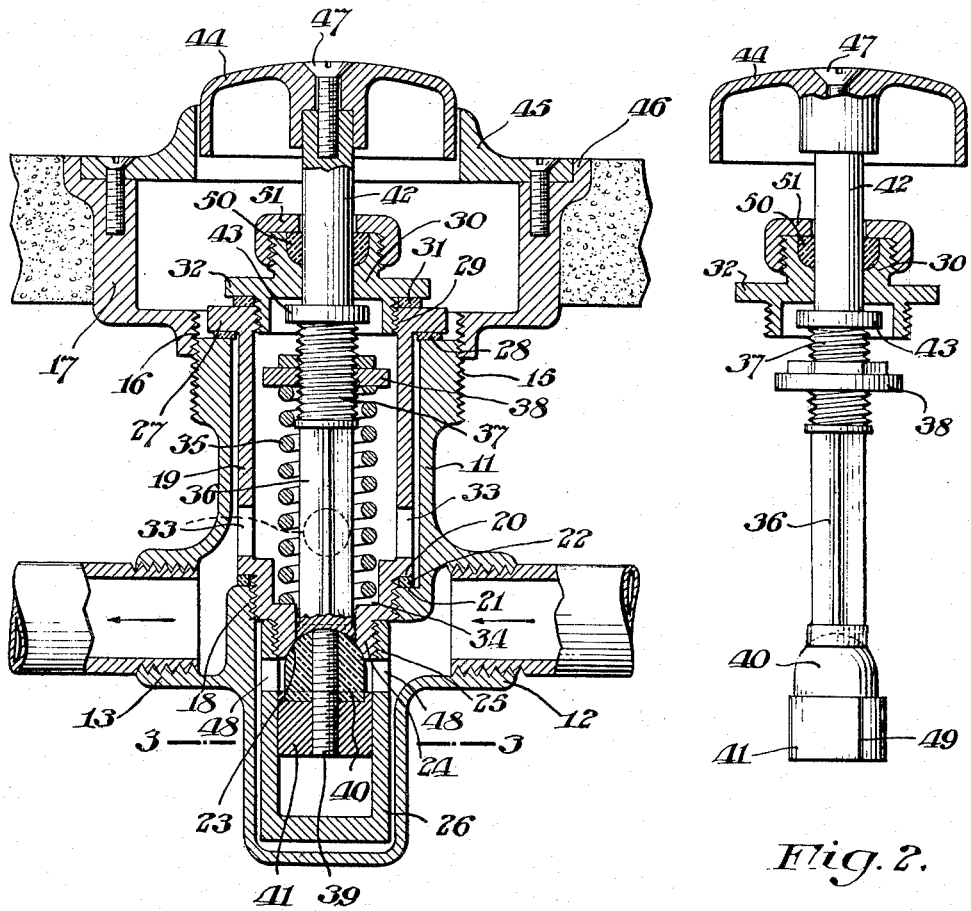
Fig. 1.
Fig. 2.
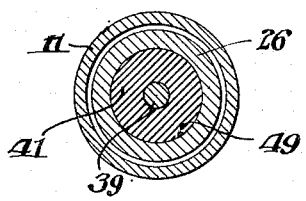
Fig. 3.
Inventor:
Charles J. Muend,
By
Attorney.

Patented Nov. 24, 1925.

1,562,979

UNITED STATES PATENT OFFICE.

CHARLES J. MUEND, OF PHILADELPHIA, PENNSYLVANIA, ASSIGNOR TO HAINES, JONES & CADBURY INCORPORATED, A CORPORATION OF PENNSYLVANIA.

VALVE.

Application filed December 28, 1921. Serial No. 525,341.

*To all whom it may concern:*

Be it known that I, CHARLES J. MUEND, a citizen of the United States, residing at Philadelphia, in the county of Philadelphia, State of Pennsylvania, have invented a new and useful Valve, of which the following is a specification.

The invention relates to improvements in valves. The object is to provide a mechanism for opening the valve arbitrarily and means whereby the closing of the valve shall be cushioned to such an extent as to prevent hammer; that is, by cushioning or easing the closing movement of the valve upon its seat, the water hammer that is frequently the result of a sudden closing, is prevented.

The invention also comprises improvements in construction and assembly, whereby the operating parts may be removed from the outer casing for repairs, adjustment and the like.

Referring to the drawings which illustrate merely by way of example suitable means for the embodiment of my invention;—

Fig. 1 is a vertical section.

Fig. 2 is an elevation of valve, piston and spindle member.

Fig. 3 is a section on line 3—3 of Fig. 1.

Similar numerals refer to similar parts throughout the several views.

In the specific example given to illustrate my invention, the valve is shown as a foot-operated valve for flushing purposes in lavatories and the like.

As a number of such valves are frequently connected along a service pipe it is especially desirable that the water hammer, due to sudden closing of a valve, be eliminated.

In the example shown the casing or chambered body 11 is an integral structure adapted to be permanently connected and it may even be embedded in the concrete of the floor. It is provided with two nozzles; one, as for example 12, adapted to be connected with the supply and the other, as for example 13, adapted to be connected with the service pipe. It is exteriorly threaded at the top, as at 15, for receiving the threaded collar 16 of the box formation 17. This casting or body member 11 is also provided with an interior thread, as at 18, for receiving the threaded end of the cylindrical body or tubular formation 19. This body 19 has an offset portion or shoulder 20 for cooperating with the offset portion 21 of casing 11; a washer or gasket 22 is interposed between the two cooperating faces to make the joint formed thereby watertight. Body 19 also has a concave or semi-spherical valve seat 23 at its lower end 24. Said lower end 24 being exteriorly threaded to receive the interiorly threaded end 25 of the cylindrical member or tubular formation 26. The upper end of cylindrical body 19 is provided with a flange 27 of octagonal peripheral shape for engagement with a wrench to facilitate turning said body 19 to effect its threaded engagement and disengagement with the threaded portion 18 of body or casing 11. This flange 27 is adapted to coact with the top surface of body 11, and, by means of the washer 28, to form a watertight joint therewith. The upper end of cylindrical body 19 is interiorly threaded as at 29 for receiving the threaded cap or plug 30, and the washer 31 between the flange 32 and the flange 27 also forms a watertight joint. Cylindrical member 19 is also provided with a plurality of apertures or openings 33 and a recess formation, as at 34, for receiving the end of the spring 35. A spindle member 36 is threaded at its upper end, as at 37, to receive the flange nut 38 which forms the other abutment of the compression spring 35. This nut is obviously adjustable on the threaded end 37 to vary the tension of the spring as required. Spindle member 36 is provided with a convex abutment at its lower end, and with the threaded extension 39, which carries the valve member 40 and the piston 41. The push rod 42 extends through the member 30 and is provided at the lower end with head 43 for limiting its upward movement in member 30. The watertight fit between rod 42 and member 30 is secured by the packing 50 and threaded cap 51. The upper end of rod 42 is secured to the cup shaped member 44 which has a slidable fit in the annular flange of plate 45, secured to the body portion 17. This member 44 is removably connected with rod 42 by means of the screw 47 and adapted to be operated by foot.

The cylinder 26, which is threaded on the bottom of cylindrical member 19, is closed at the bottom but is provided near the top with a plurality of openings as at 48. The interior of this cylinder is carefully machined or ground, as is the periphery of piston 41, so that the piston shall have a free movable, but approximately airtight and watertight fit in said cylinder. A single channel, which is little more than a scratch, as at 49, running along the periphery of the piston, parallel with its axis, serves to permit a very slow leak of air or water past the piston in each of its reciprocating movements.

In operation: It will be noted that the intake nozzle 12 communicates with the interior of the body 11 below the gasket or washer joint 22, while the discharge nozzle 13 communicates with the interior of the body 11 above said washer or gasket 22. It will therefore be seen that when the parts are in the position shown in Fig. 1, the valve 40 being upon its seat, there will be no communication between nozzles 12 and 13. This valve 40 is held upon its seat by means of the spring 35. Upon pressing downwardly upon the cap or member 44, the end 43 of rod 42 engages the top or threaded end 37 of valve spindle 36 and forces the valve 40 away from its seat. This permits the flow of water from nozzle 12 through ports 48 upwardly into the tubular formation 19, out through the ports 33 to the nozzle member 13, and thence to the service pipe. Upon release of pressure on member 44, the valve 40 moving in response to spring 35 and in direction of the flow of the water, would normally seat so abruptly on its seat 23, as to cause what is usually known as water hammer, due to suddenly interrupting the flow of liquid which has acquired momentum. To obviate this objectionable action I have secured to the end 39 of valve spindle 36 the piston 41 operating in the cylinder 26. The very slight channel 49 serves to permit a sufficient leak of air or water from the bottom of cylinder 26 past said piston as the said piston is forced downwardly. It follows that upon the return movement of this piston, there being no relief port in the bottom of the cylinder, the piston can only travel upwardly, in response to the spring actuation, so fast as air or water can pass from above the piston to below the piston to relieve the vacuum that would otherwise be formed by the upward movement of said piston. This results in a sufficiently gradual upward movement, to prevent shock due to sudden closing.

It is also to be noted that while, as above stated, the body or casting 11 may be permanently set in the building construction; the entire tubular formation 19—26 and all the other parts which constitute the operating parts may be lifted from the casting 11, simply by disengaging the threaded connection at 18 and lifting out the cylinders 19 and 26 and the elements contained therein, so that any desired adjustment or repairs may be made, without, in any way disturbing the body portion 11.

What I claim is:—

1. In a valve mechanism for liquid supply, the combination of a chambered body having a closed cylindrical lower end and horizontal inlet and discharge nozzles positioned above said cylindrical end, a self-containing valve structure comprising a tubular formation adapted to be removably secured within said chambered body, providing a valve seat between the two nozzles and a dash pot recess, and a valve, a piston in fixed relation with the valve and operating in the dash pot and an actuating spring therefor, all housed in said tubular formation.

2. In a valve mechanism for liquid supply, the combination of a chambered body having a closed cylindrical lower end and horizontal inlet and discharge nozzles positioned above said cylindrical end, a self-containing valve structure comprising a tubular formation adapted to be removably secured within said chambered body, providing a valve seat between the two nozzles and a dash pot recess, and a valve, a piston in fixed relation with the valve and operating in the dash pot and an actuating spring therefor, all housed in said tubular formation, the piston provided with a channel extending from top to bottom of the piston on its outer surface.

3. In a valve mechanism for liquid supply, the combination of a chambered body having a closed cylindrical lower end and horizontal inlet and discharge nozzles positioned above said cylindrical end, a self-containing valve structure comprising a tubular formation, adapted to be removably secured by threaded engagement within said chambered body, providing a valve seat between the two nozzles and a dash pot recess below the valve seat, a valve, a piston in fixed relation with the valve and operating in the dash pot and an actuating spring therefor, all housed in said tubular formation.

4. In a valve mechanism for liquid supply, the combination of a chambered body having a closed cylindrical lower end and horizontal inlet and discharge nozzles positioned above said cylindrical end, a self-containing valve structure comprising a tubular formation adapted to be removably secured by threaded engagement within said chambered body, providing a valve seat between the two nozzles and a dash pot recess below the valve seat, a valve, a piston in fixed relation with the valve and operating in the dash pot and an actuating spring therefor, all housed in said tubular formation, and threaded means for maintaining the spring in operative position within the tubular formation and under required tension adjustment.

5. In a valve mechanism for liquid supply, the combination of a chambered body having a closed cylindrical lower end and horizontal inlet and discharge nozzles positioned above said cylindrical end, a self-containing valve structure comprising a tubular formation adapted to be removably secured by threaded engagement within said chambered body, providing a valve seat between the two nozzles and a dash pot recess below the valve seat, a valve, a piston in fixed relation with the valve and operating in the dash pot and an actuating spring therefor, all housed in said tubular formation, a valve actuating rod and a guide therefor in threaded engagement with the tubular formation.

6. In a valve mechanism for liquid supply, the combination of a chambered body having a closed cylindrical lower end and horizontal inlet and discharge nozzles positioned above said cylindrical end, a self-containing valve structure comprising a tubular formation adapted to be removably secured within said chambered body, providing a valve seat between the two nozzles and a dash pot recess, a valve, a piston in fixed relation with the valve and operating in the dash pot and actuating means therefor, all housed in said tubular formation, a valve actuating rod and a guide therefor in threaded engagement with the tubular formation, and a foot operated member for operating said rod, and a housing therefor in threaded engagement with the chambered body.

CHARLES J. MUEND.